United States Patent [19]

Gunesin et al.

[11] Patent Number: 4,829,135

[45] Date of Patent: May 9, 1989

[54] MULTI-STAGE ANIONIC DISPERSION HOMOPOLYMERIZATION TO FORM MICROPARTICLES WITH NARROW SIZE DISTRIBUTION

[75] Inventors: Binnur Z. Gunesin, New York, N.Y.; James G. Murray, East Brunswick, N.J.; Frederick C. Schwab, Metuchen, N.J.; Ronald J. Gustafson, North Brunswick, N.J.

[73] Assignee: Mobil Oil Corporation, New York, N.Y.

[21] Appl. No.: 138,971

[22] Filed: Dec. 29, 1987

[51] Int. Cl.$^4$ .............................. C08F 2/14; C08F 4/48
[52] U.S. Cl. ...................................... 526/173; 526/87; 526/201; 526/346; 526/909
[58] Field of Search ........................... 526/87, 173, 201

[56] References Cited

U.S. PATENT DOCUMENTS

| | | | |
|---|---|---|---|
| 3,169,948 | 2/1965 | Hardy | 526/87 |
| 3,402,160 | 9/1968 | Hayes | 526/201 |
| 3,770,712 | 11/1973 | Schwab | 260/93.5 |
| 4,247,434 | 1/1981 | Lovelace et al. | 260/29.6 RB |
| 4,386,125 | 5/1983 | Shiraki et al. | 428/36 |

*Primary Examiner*—Howard J. Smith
*Attorney, Agent, or Firm*—Alexander J. McKillop; Charles J. Speciale; Michael J. Mlotkowski

[57] ABSTRACT

Styrene or other anionically polymerizable monomer is anionically homopolymerized in a dispersion using a non-solvent, e.g., hexane using three or more stages to obtain spherical microparticles, e.g., 2-5 microns, with a narrow size distribution.

20 Claims, No Drawings

MULTI-STAGE ANIONIC DISPERSION HOMOPOLYMERIZATION TO FORM MICROPARTICLES WITH NARROW SIZE DISTRIBUTION

BACKGROUND OF THE INVENTION

There has been considerable interest in developing methods for preparing monodisperse polymer particles, i.e., having a narrow particle size distribution, particularly with particle sizes greater than about 2 microns. One polymer of particular interest in this application is polystyrene.

As disclosed in U.S. Pat. No. 4,247,434 which is incorporated herein by reference, microparticles in latex form find utility in a number of applications and yet other applications are awaiting the development of monodisperse polymer particles having a particle size above 2 microns. Such polymer particles are used as a reference standard for the calibration of various instruments, in medical research and in medical diagnostic tests.

The difficulty of preparing monodisperse polymer particles is evident from U.S. Pat. No. 4,247,434 in which the polymerization is conducted in microgravity, such as in outer-space.

This invention provides a process tool for assisting in achieving narrow particle size distribution and particle sizes greater than 2 microns by conducting multi-stage anionically catalyzed homopolymerizations under conditions selected to promote monodispersity.

Although multi-stage anionic polymerizations have been conducted to prepare block-copolymers, for example in U.S. Pat. No. 4,386,125, which is incorporated herein by reference, to our knowledge the anionic dispersion homopolymerization of monomers to prepare polymer particles having a particle size of greater than 2 microns and a narrow particle size distribution has not been previously proposed.

SUMMARY OF THE INVENTION

Anionically polymerizable monomer is homopolymerized in a dispersion in a non-solvent for the polymerized monomer by adding the monomer in three or more stages in which the particle size increases and the particle size distribution narrows in each successive stage. Polymer microspheres having particle size distributions $D_w/D_n$ of less than 1.2 and particle sizes of 2 microns to 5 microns or more can be obtained.

DETAILED DESCRIPTION OF THE INVENTION

The general process conditions suitable for preparation of the polymer microparticles of this invention are described in U.S. Pat. No. 3,770,712 except that lower temperatures of reaction are preferred here. U.S. Pat. No. 3,770,712 is incorporated herein by reference in its entirety.

This invention is applicable to the homopolymerization of anionically polymerizable monomers generally but particularly vinyl aromatic monomers, such as styrene and substituted styrenes. Suitable substituted styrenes include alkyl-substituted styrenes, particularly methyl-substituted styrenes such as para-methylstyrene. Styrenes with polar groups such as chloride substituents cannot be used in anionic polymerization.

Suitable anionic catalysts include n-butyl-lithium, sec-butyl-lithium and t-butyl-lithium. The concentration of the catalyst is generally less than $5\times$ to $10^{-3}$ moles per mole of monomer.

The reaction is conducted in an inert medium, which is a non-solvent for the polymer, such as paraffinic or monoolefinic hydrocarbons having between about 4 and 7 carbon atoms. Aromatic hydrocarbons and polar solvents are not suitable. Examples of useful slurry media are butane, isobutane, pentane, isopentane, hexane, heptane, 2,2 dimethyl-butane, and petroleum ether.

The process of polymerization can be carried out at temperatures between 0° C. and about 100° C. but preferably between about 0° C. and 25° C. It is contemplated that the reaction can be conducted under pressure with a solvent such as isobutane which is highly volatile at the reaction temperature. Such a highly volatile solvent and pressure reaction conditions are advantageous in separating the polymer particles from the slurry medium.

The polymeric dispersing agent which is preferably used to maintain the polymer in suspension as it is formed is advantageously a block copolymer, particularly A-B diblock copolymers in which the A block is styrene and the B block is an aliphatic monomer block of isoprene, hydrogenated isoprene or the like. The dispersing agent is generally present in amounts of about 0.1 to 5.0 weight percent of monomers.

The polymerization reaction is preferably conducted without agitation, and violent agitation or mixing is generally not considered desirable. The monomer is added in at least three stages with considerable latitude in the number of stages used and the proportion of monomer added during each stage. The greater the number of stages, in general, the narrower the particle size distribution and the larger the particle size. Advantageously, the bulk of the monomer is introduced in the first stage and 10 weight percent to about 40 weight percent more monomer, preferably 20 to 30 weight percent, is introduced in two or more successive stages.

Particle size distributions ($D_w/D_n$) of less than 1.2, in which $D_w$ = weight average diameter and $D_n$ = number average diameter, are achieved with particles of at least 2 micron average diameter.

The invention is illustrated by the following non-limiting example in which all parts are by weight unless otherwise specified.

EXAMPLE

The following ingredients were used in Step 1:
35.15 g styrene (purified by passing through activated alumina)
155.0 g hexane
0.88 g Stereon - 840A*
3.0 g tetrahydrofuran (THF)
0.1 ml 1% phenanthroline
0.25 nl 1.4M sec-butyllithium
*Stereon 840A is a styrene-butadiene radial block copolymer from Firestone In a 500 ml bottle Stereon 840A was dissolved in styrene and hexane, THF and phenanthroline were added. The system was cooled to 5° C. in ice/water. The system was purged with $N_2$ and the sec-butyl lithium was added dropwise through a deoxygenated hypodermic syringe. The system was titrated with sec-butyl lithium until the point at which the orange color stays stable. The polymerization rate was kept low by carrying the reaction out at low temperature. The system was not rotated or mixed but left still. After 2 hours an additional 7 g. of styrene was added after distilling over sec-butyl lithium (Stage 2). After 2 more hours an additional 10g of styrene was added and left for 2 hours (Stage 3).

Samples were taken after each Stage 1, 2 and 3 and studied for particle size and particle size distribution. (Particle size distribution = Dw/Dn, in which $D_w$ is the weight average particle size and $D_n$ is the number average particle size). The results were:

|  | Average Particle Size (microns) | Particle Size Distribution |
|---|---|---|
| Stage 1 | 3.5 | Broad |
| Stage 2 | 4.0 | Broad |
| Stage 3 | 5.0 | 1.2 |

No new particles appear to form in Stage 2 and Stage 3 but the existing particles from Stage 1 continue to grow.

We claim:

1. A multi-stage process for homopolymerization of an anionically polymerizable vinyl aromatic monomer, comprising the steps of:
   (a) conducting a first stage of the polymerization process by introducing about 60 to 90 weight percent of the monomer in a dispersing medium which is not a solvent for the polymerized monomer and polymerizing in the presence of an anionic polymerization catalyst, said catalyst present in an amount less than about $5 \times 10^{-3}$ moles per mole of monomer and a polymeric dispersing agent, said dispersing agent present in an amount from about 0.1 to 5.0 weight percent of the monomer; and
   (b) introducing about 10 to 40 weight percent of the monomer in at least two succcessive stages of polymerization, said successive stages conducted under process conditions recited in step (a),
   whereby polymer particles are obtained having a particle size of at least a 2 micron average diameter and a particle size distribution (Dw/Dn) of 1.2 or less.

2. The process of claim 1 in which said monomer is a non-polar substituted styrene vinyl aromatic monomer.

3. The process of claim 1 in which said monomer is styrene.

4. The process of claim 1 in which the anionic polymerization catalyst is sec-butyl lithium.

5. The process of claim 2 in which the anionic polymerization catalyst is sec-butyl lithium.

6. The process of claim 3 in which the anionic polymerization catalyst is sec-butyl lithium.

7. The process of claim 1 in which the dispersing medium is a $C_3$–$C_6$ aliphatic hydrocarbon.

8. The process of claim 2 in which the dispersing medium is a $C_3$–$C_6$ aliphatic hydrocarbon.

9. The process of claim 3 in which the dispersing medium is a $C_3$–$C_6$ aliphatic hydrocarbon.

10. The process of claim 4 in which the dispersing medium is a $C_3$–$C_6$ aliphatic hydrocarbon.

11. The process of claim 5 in which the dispersing medium is a $C_3$–$C_6$ aliphatic hydrocarbon.

12. The process of claim 6 in which the dispersing medium is a $C_3$–$C_6$ aliphatic hydrocarbon.

13. The process of claim 11 in which said polymeric dispersing agent is a styrene-butadiene radial block copolymer.

14. The process of claim 3 in which said polymeric dispersing agent is a styrene-butadiene radial block copolymer.

15. The process of claim 4 in which said polymeric dispersing agent is a styrene-butadiene radial block copolymer.

16. The process of claim 6 in which said polymeric dispersing agent is a styrene-butadiene radial block copolymer.

17. The process of claim 10 in which said polymeric dispersing agent is a styrene-butadiene radial block copolymer.

18. The process of claim 10 in which said polymeric dispersing agent is a styrene-butadiene radial block copolymer.

19. The process of claim 12 in which said polymeric dispersing agent is a styrene-butadiene radial block copolymer.

20. The process of claim 19 wherein the homopolymerization is conducted at a temperature of between about 0° C. and 25° C. in the absence of agitation or mixing.

* * * * *